United States Patent Office 3,684,741
Patented Aug. 15, 1972

3,684,741
SUPPORTED CATALYSTS CONTAINING VANADIUM PENTOXIDE AND TITANIUM DIOXIDE AND THEIR USE FOR THE PRODUCTION OF CARBOXYLIC ACIDS AND CARBOXYLIC ANHYDRIDES
Wilhelm Friedrichsen, Ludwigshafen, and Otto Goehre, Wilhelmsfeld, Germany, assignors to Badische Anilin- & Soda-Fabrik Aktiengesellschaft, Ludwigshafen (Rhine), Germany
No Drawing. Filed Aug. 12, 1969, Ser. No. 849,521
Claims priority, application Germany, Aug. 20, 1968,
P 17 69 998.8
The portion of the term of the patent subsequent to
Sept. 2, 1986, has been disclaimed
Int. Cl. B01j 11/82
U.S. Cl. 252—435    8 Claims

ABSTRACT OF THE DISCLOSURE

Supported catalysts for the oxidation of aromatic or unsaturated aliphatic hydrocarbons to carboxylic acids or anhydrides, consisting of an inert nonporous carrier and an active composition of 1 to 40 parts by weight of vanadium pentoxide and 60 to 90 parts by weight of titanium dioxide and also 0.01 to 10% by weight (with reference to the amount of vanadium pentoxide) of a phosphorus compound, the vanadium pentoxide content of the whole supported catalyst being 0.05 to 3% by weight. The catalysts are used especially for the production of phthalic anhydride from o-xylene.

---

The present invention relates to new supported catalysts containing vanadium pentoxide and titanium dioxide which are particularly suitable for the oxidation of aromatic and unsaturated aliphatic hydrocarbons into carboxylic acids and carboxylic anhydrides and to the use of the catalysts for the said purpose.

Supported catalysts which consist of an inert non-porous carrier material and an active catalyst composition containing vanadium pentoxide and titanium dioxide which is applied thereto in a thin layer are known from British Pat. 1,140,264.

The present invention has for an object to prolong the life of the prior art catalysts while at least maintaining their activity and to improve the yield of the desired products.

We have found that supported catalysts of inert non-porous carrier material and an activated composition containing vanadium pentoxide and titanium dioxide applied thereto have the desired properties when the active composition consists substantially of a mixture of from 1 to 40, particularly from 1 to 15, parts by weight of vanadium pentoxide and 60 to 99, particularly 85 to 99, parts by weight of titanium dioxide and also from 0.01 to 10% by weight (with reference to the total amount of vanadium pentoxide and of titanium dioxide (=100%) of a phosphorus compound (calculated as $PO_4^{---}$), the content of vanadium pentoxide in the supported catalyst consisting of carrier material and active composition being from 0.05 to 3% by weight.

A solid or liquid phosphorus compound is added to the active composition in the preparation of the same. It is advantageous to use alkali metal or ammonium phosphates, alkaline earth metal phosphates, aluminum phosphate or the corresponding metaphosphates or pyrophosphates or orthophosphoric, metaphosphoric or pyrophosphoric acid or esters of phosphoric acid such as triisobutyl phosphate. It is particularly advantageous to use the phosphorus compound in the form of phosphoric acid or as phosphorus compounds having volatile cations in order also to convert the sulfates, chlorides and the like contained in the mixture of vanadium pentoxide and titanium dioxide into phosphates, because particularly sulfates have a detrimental effect on the oxidation reaction. Generally about 0.01 to 5.00%, particularly 0.02 to 2.5%, by weight of phosphorus compounds (calculated as $PO_4^{---}$)) is required with reference to the amount of active composition (=100%).

The preferred modification of titanium dioxide is anatase.

Non-porous inert substances such as quartz, porcelain, magnesium oxide, silicon carbide, rutile, silicates such as aluminum, magnesium, zirconium and cerium silicates, or aluminas, each of these being in crystalline amorphous or sintered condition are used as a carrier material for the catalyst. The porosity of the carrier material should preferably be equivalent to an internal surface area which is not more than 3 and particularly not more than 0.5 $m.^2/g$.

It is particularly advantageous to use the carrier material in the form of granules, cones, pellets, rings and the like, especially in the form of spheres, the spheres having a diameter of from 4 to 12 mm. The thickness of the layer of active composition on the carrier material is preferably from 0.01 to 3.00 mm., particularly from 0.02 to 1 mm.

The active catalyst composition may contain other substances, for example compounds of iron, nickel, cobalt, manganese, tin, silver, copper, chromium, molybdenum, tungsten, iridium, niobium, arsenic or antimony, preferably in the form of oxides, in minor amounts (for example up to 15% by weight of the content of vanadium pentoxide and titanium oxide (=100%)) in addition to the components which are essential according to the invention, namely vanadium pentoxide, titanium dioxide and the phosphorus compound.

Lithium, zirconium, aluminum, cerium and magnesium compounds are particularly preferred as further ingredients.

Suitable lithium compounds (in addition to lithium oxide) include lithium hydroxide, the lithium halides, lithium carbonate, lithium sulfate, lithium nitrate, lithium phosphates, lithium formate, lithium acetate and lithium oxalates or mixtures of these compounds. The content of lithium compounds should not exceed 10% by weight (as $Li_2O$) with reference to the mixture of vanadium pentoxide and titanium dioxide.

Examples of zirconium compounds (in addition to zirconium dioxide) are the zirconium halides, zirconium oxyhalides, zirconium sulfate, zirconium formate, zirconium oxalate and zirconium acetate.

The aluminum compounds may be introduced into the catalyst composition as aluminum oxide (as which it is later present in the catalyst) or as hydroxide, nitrate, carbonate, oxalate or acetate.

According to the teaching of the present invention it is moreover recommended that the said additional ingredients of the catalyst should be introduced as phosphates.

Various methods, known per se, may be used for the production of the supported catalysts. For example an aqueous suspension (if desired provided with a thickening agent such as an alginate or polyacrylate) of the ingredients of the active mass may be applied to the carrier, for example by intimate mixing in a coating machine at 150° to 500° C., preferably 250° to 500° C. The wettability of the carrier material may often be increased if the suspension contains organic water-soluble liquids such as alcohols or dimethylformamide. Furthermore the bond strength between the active mass and the carrier material may be improved by slightly etching the latter for example with hydrofluoric acid or compounds such as ammonium fluoride which give off hydrogen fluoride. Additions of urea, thiourea or ammonium thiocyanate to the active mass to be applied exert a favorable effect on the bond strength of the active mass to the carrier material.

It is not necessary to start from vanadium pentoxide or titanium dioxide for the production of the active composition. Rather an appropriate amount of a salt, for example of the oxalate, may be used and the vanadium pentoxide and/or titanium dioxide then developed in the coated carrier material by oxidation with air at a temperature of from 350° to 600° C., particularly up to 550° C.

Another possibility for providing the carrier material with the active composition consists in applying the constituents of the active composition at from 150° to 500° C. from a melt of an organic substance, for example ammonium thiocyanate, in a coating machine to the carrier material and then heating the catalyst in a current of air so that the organic substance volatilizes or burns off and if necessary the vanadium pentoxide and the titanium dioxide are developed when compounds of vanadium and titanium other than the oxides have been used as starting materials.

The supported catalysts according to the invention are suitable for accelerating and steering organic oxidation reactions, particularly for the oxidation of aromatic or unsaturated aliphatic hydrocarbons to dicarboxylic acids and dicarboxylic anhydrides. These catalysts have particular commercial importance for the production of phthalic anhydride from naphthalene or o-xylene and also for the production of maleic anhydride from benzene, butenes or butadiene or for the production of pyromellitic acid from durene.

The oxidation reactions may be carried out in the conventional way as when using conventional catalysts, i.e. by passing a gaseous mixture of the hydrocarbon to be oxidized and oxygen or gas containing oxygen such as air over the supported catalyst, advantageously in a tube furnace, at atmospheric or superatmospheric pressure and at temperatures of the heat exchange medium of from 350° to 450° C. The catalysts may also be used in a fluidized bed.

The catalysts according to the invention have a particularly long life and are suitable for sustained operation without loss of activity.

The invention is illustrated by the following example.

EXAMPLE 2500 g. of 6-mm. magnesium silicate spheres are sprayed in a coating drum heated to 300° C. with 400 g. of an aqueous suspension prepared from water, 42.5 g. of formamide, 18.7 g. of oxalic acid, 8.5 g. of vanadium pentoxide, 133 g. of anatase and 1 g. of ammonium dihydrogen phosphate (equivalent to 0.82 g. of $PO_4^{---}$). The proportion of active composition in the supported catalyst is 4.0% by weight and the proportion of vanadium pentoxide is about 6% by weight. The phosphate content is about 0.56% by weight of the content of vanadium pentoxide and titanium dioxide and the mean thickness of the active composition on the spheres is about 0.05 mm.

After the coating operation, this supported catalyst is heated for one hour in a current of air at 450° C., after which it is ready for use.

The following experiment illustrates the activity of this supported catalyst:

A mixture of 5100 liters of air and 204 g. of vaporous o-xylene having a purity of 95% was passed per hour through a tube having a diameter of 25 mm. and a length of 3 meters which was tightly packed with the supported catalyst at a salt bath temperature of 385° C.

Phthalic anhydride and maleic anhydride were obtained in a ratio by weight of 1:0.035 and in a yield by weight of 112.0% calculated on the amount of pure o-xylene (100%). The product contained only 0.1% of phthalide and exhibited a particularly low color number in the heat stability test.

No decline in the activity of the catalyst, even trivial or transient, was observed during the period of six months during which the experiment was carried out. Without the addition of phosphate according to the invention to the catalyst, a salt bath temperature of 405° C. is necessary to obtain the same yield and purity.

We claim:

1. A supported catalyst for oxidation reactions consisting of an inert non-porous carrier material and an active catalyst composition containing vanadium pentoxide and titanium dioxide applied thereto in a thin layer wherein the active composition consists essentially of a mixture of 1 to 40 parts by weight of vanadium pentoxide, 60 to 99 parts by weight of titanium dioxide and 0.01 to 5% by weight of a phosphorus compound, calculated as the trivalent $PO_4$ anion and taken with reference to the total amount of vanadium pentoxide and titanium dioxide, said phosphorus compound being selected from the group consisting of phosphoric acid, metaphosphoric acid, pyrophosphoric acid, the alkali metal, alkaline earth, aluminum and ammonium salts of said acids and tri-isobutyl phosphate, the content of vanadium pentoxide in the supported catalyst consisting of carrier material and active composition being from 0.05 to 3% by weight.

2. A supported catalyst as claimed in claim 1 wherein the layer of active composition has a thickness of about 0.01 to 3.00 mm.

3. A supported catalyst as claimed in claim 1 wherein the carrier material is in the form of spheres having a diameter of 4 to 12 mm. and an internal surface area of not more than 3 m.²/g., the active composition supported thereon having a thickness of about 0.02 to 1 mm.

4. A supported catalyst as claimed in claim 1 wherein said phosphorous compound is an ammonium salt of phosphoric, metaphosphoric or pyrophosphoric acid.

5. A supported catalyst as claimed in claim 1 wherein the phosphorus compound is added to the active catalyst composition as the free acid.

6. A supported catalyst as claimed in claim 1 wherein the phosphorus compound is added to the active catalyst composition as a phosphate having a volatile cation.

7. A supported catalyst as claimed in claim 1 wherein the titanium dioxide is used in the modification anatase.

8. A supported catalyst as claimed in claim 1 wherein the carrier material is in the form of spheres having a diameter of from 4 to 12 mm.

References Cited

UNITED STATES PATENTS

| 2,773,838 | 12/1956 | Reid et al. | 252—437 |
|---|---|---|---|
| 3,086,026 | 4/1963 | Wiebusch | 252—437 X |
| 3,156,705 | 10/1964 | Kerr | 252—437 X |
| 3,156,706 | 11/1964 | Kerr | 252—437 X |
| 3,288,721 | 11/1966 | Kerr | 252—435 |
| 3,464,930 | 9/1969 | Friedrichsen | 252—469 |
| 2,809,939 | 10/1957 | Dixon et al. | 252—456 |
| 3,507,813 | 4/1970 | Vrbaski | 252—464 |

PATRICK P. GARVIN, Primary Examiner

U.S. Cl. X.R.

252—430, 437; 260—524 R, 533 N, 346.4, 346.8